United States Patent [19]

McGahee

[11] 4,228,611
[45] Oct. 21, 1980

[54] METHOD FOR FABRICATING FISHING LURES ETC.

[75] Inventor: Welbourne D. McGahee, Melbourne, Fla.

[73] Assignee: Loop-A-Line, Inc., Melbourne, Fla.

[21] Appl. No.: 905,738

[22] Filed: May 16, 1978

Related U.S. Application Data

[62] Division of Ser. No. 760,920, Jan. 21, 1977, Pat. No. 4,095,315.

[51] Int. Cl.³ .............................................. A01K 85/00
[52] U.S. Cl. ..................................... 43/42.53; 29/453; 29/458; 29/463; 43/42.36; 43/44.92; 264/274; 264/275; 264/277

[58] Field of Search .......................... 29/453, 458, 463; 264/274, 275, 277; 43/43.1, 44.92, 42.44, 42.53, 42.14, 42.36

[56] References Cited

U.S. PATENT DOCUMENTS

| | | | |
|---|---|---|---|
| 2,391,167 | 12/1945 | Kelly | 43/44.92 |
| 2,741,057 | 4/1956 | Morris et al. | 43/42.36 X |
| 2,821,045 | 1/1958 | Shabarick | 43/42.44 |
| 3,344,550 | 10/1967 | Peters | 43/42.53 X |
| 3,514,358 | 5/1970 | Monaghan et al. | 264/274 X |
| 3,959,060 | 5/1976 | Jones | 264/277 X |

*Primary Examiner*—Charlie T. Moon

[57] ABSTRACT

A method and apparatus for producing fishing lures incorporating hook hangers which utilize a bore formed in the lure body as part of the connection mechanism. Injection molding techniques are utilized to fill cavity molds having removable inserts therein.

4 Claims, 28 Drawing Figures

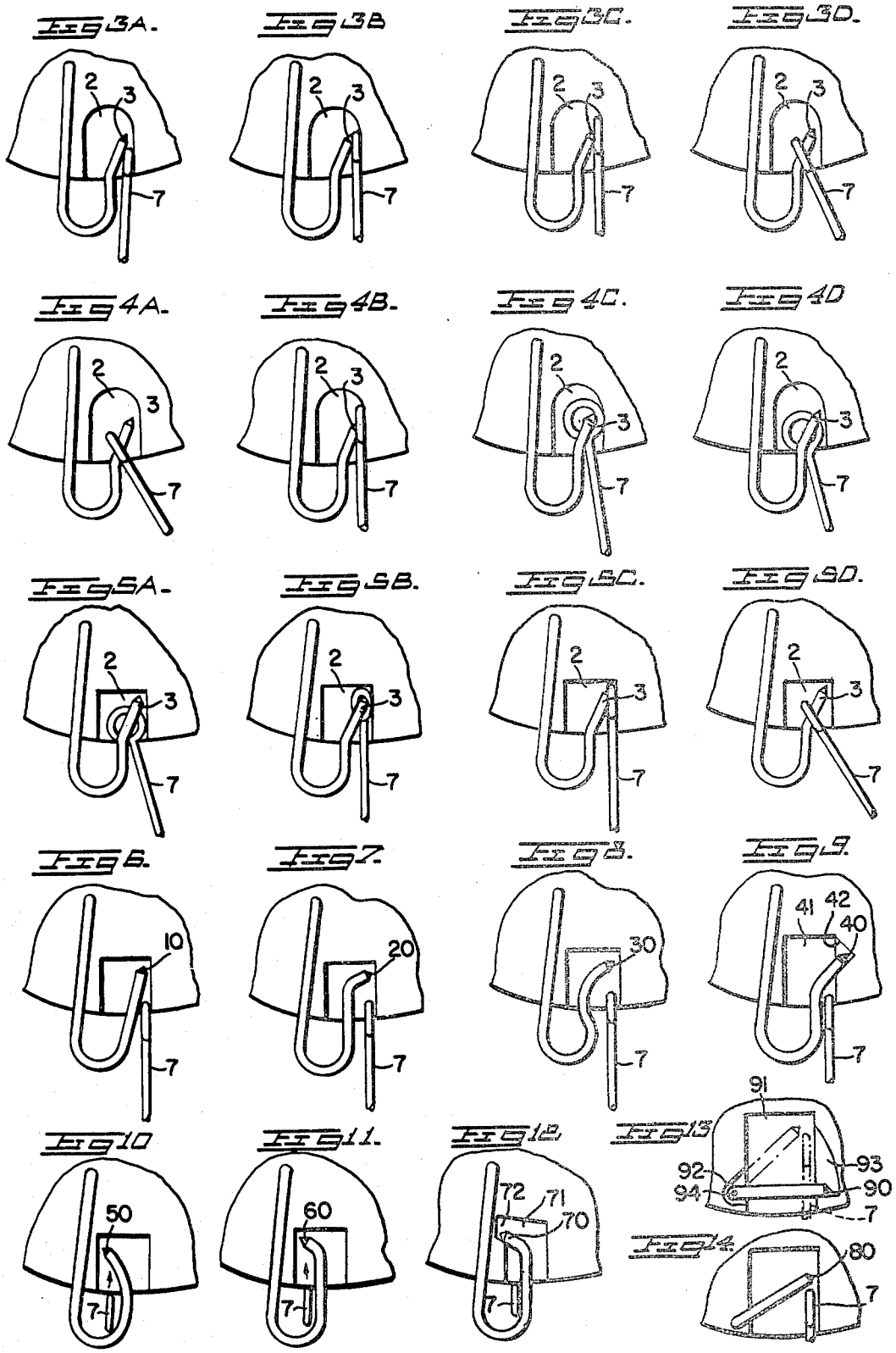

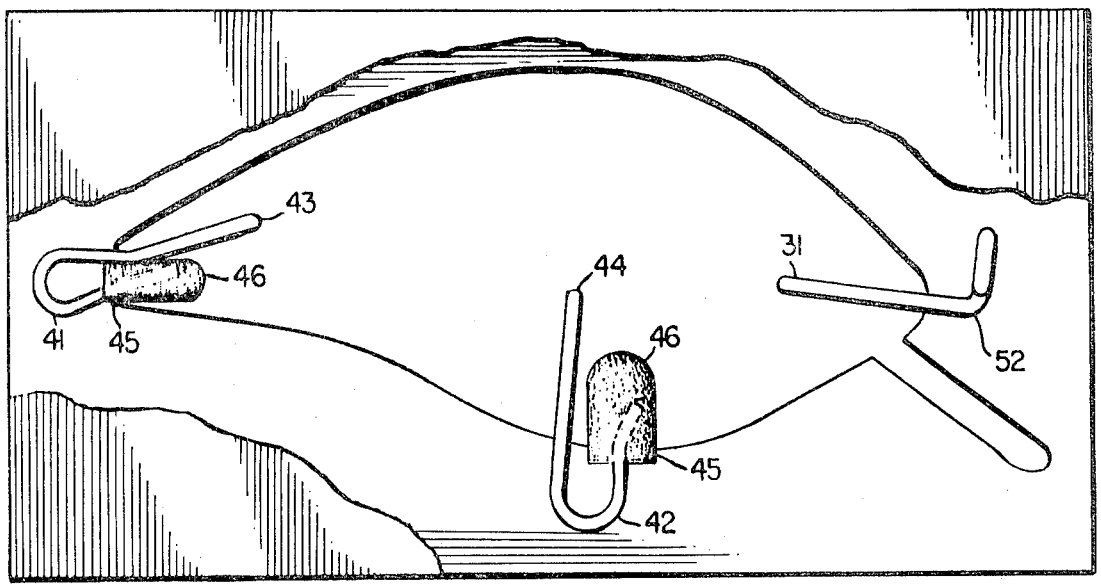
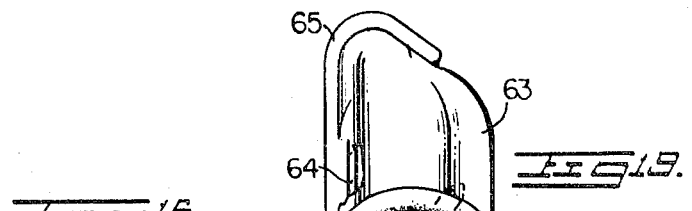
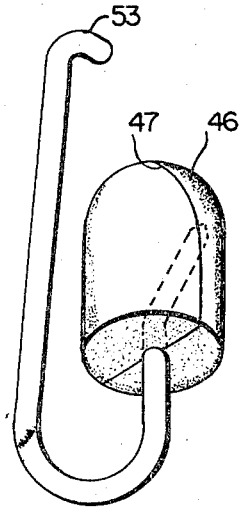
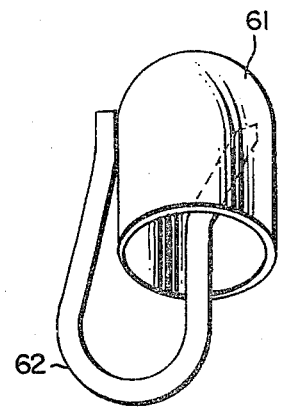

METHOD FOR FABRICATING FISHING LURES ETC.

THE INVENTION

This invention relates to fishing lures and to methods of fabricating fishing lures which utilize a rapid connect hook hanger, which is a divisional application of copending application Ser. No. 760,920, filed Jan. 21, 1977, now Pat. No. 4,095,315, issued June 20, 1978, on "Loop Retainer" filed by Welbourne D. McGahee. The novel concepts embodied herein embrace special techniques of injection molding and the mechanical assembly of molded products, hook hangers, and hooks.

BACKGROUND OF THE INVENTION

The production of fishing lures has progressed from a relatively early state of the art where lure bodies were carved of wood and similar materials to the present technology which utilizes injection molding techniques. However, regardless of whether the lure body is a hand carved object or an injection molded piece, the hook hangers, hooks and leader connectors must be attached by a time consuming manual procedure. These procedures include riveting or screwing hook hanger devices onto lure bodies with the hook in position on the hanger or subsequently attached thereto with a split ring. Alternate methods of production are utilized where a screw eye is assembled to a hook eye and the screw eye is then manually threaded into the lure body. Similar techniques are used to affix the leader connecting mechanism at the front of the lure body and each apparatus which is affixed to the lure necessitates a number of manual manipulations.

Prior art fishing lures are dangerous to ship and store because of the danger presented by the hooks which are permanently installed during manufacture. This permanency of installation also contributes to the relatively short useful life of fishing lures which is a direct function of the deterioration of hook points. Because hooks cannot be interchanged quickly, the lures are usually discarded.

OBJECTIVES OF THE INVENTION

Therefore, it is a primary objective of the present invention to provide a method for assembling a lure in which the hangers and hooks may be affixed with a minimal amount of manual labor.

A further objective of the present invention is to provide a method of fabricating a lure which may be completely automated.

A still further objective of the present invention is to provide a die for injection molding which is adapted to position hook hangers so that they will become an integral part of the final molded object.

A further objective of the present invention is to provide a method and apparatus for forming a bore within a molded lure body that is dimensioned to cooperate with a spring hook hanger.

A still further objective of the present invention is to provide a method for manufacturing fishing lures which will reduce labor requirements and result in an inexpensive end product.

Another objective of the present invention is to provide a fishing lure in which final assembly of hooks is accomplished by the user immediately prior to use thus making it safer to ship and store.

A still further objective of the present invention is to provide a fishing lure which incorporates a means to permit easy and rapid hook exchange and thus greatly extend lure flexibility and life.

SUMMARY OF THE INVENTION

This invention presents a fishing lure and a method of assembling fishing lures which may be accomplished manually with a minimal amount of labor expended or alternately may be completely automated. It includes the steps of forming a lure body with integral cups and associated hook hangers, and affixing the hooks thereto by pressing them into the cups so that the spring hook hanger snaps into the hook eye. Alternate embodiments are disclosed which includes the concept of molding a one piece body in a split die incorporating recesses to secure the hook hangers so they will be properly positioned during the forming process.

The patent also presents methods for forming cups within lures which include the use of a removable cup forming male mold piece that may be used to hold a spring hook hanger in proper position and then removed from the lure body after the injection molding step is completed.

The foregoing and other objectives of the invention will become apparent in light of the drawings, specifications and claims contained herein.

DESCRIPTION OF THE DRAWINGS

FIGS. 3A through 3D depict the sequence of placing a hook eye on the retainer.

FIGS. 4A through 4D depict the sequence of events required to remove a hook.

FIGS. 5A through 5D depict the sequence of events required to place an eyelet on the retainer when the retainer end is in close proximity to the bore bottom.

FIGS. 6 through 14 illustrate various embodiments of the present invention.

FIG. 15 is a cutaway view of a metal die adapted to mold a solid lure incorporating the improvements required to enable fabrication by the method disclosed herein.

FIG. 16 is a detailed view of a cup forming means used in an alternate method of injection molding a solid lure.

FIGS. 17 and 19 illustrates integral cups and spring hangers used in alternate embodiments of lure assembly.

DESCRIPTION OF THE INVENTION

Figure 1:
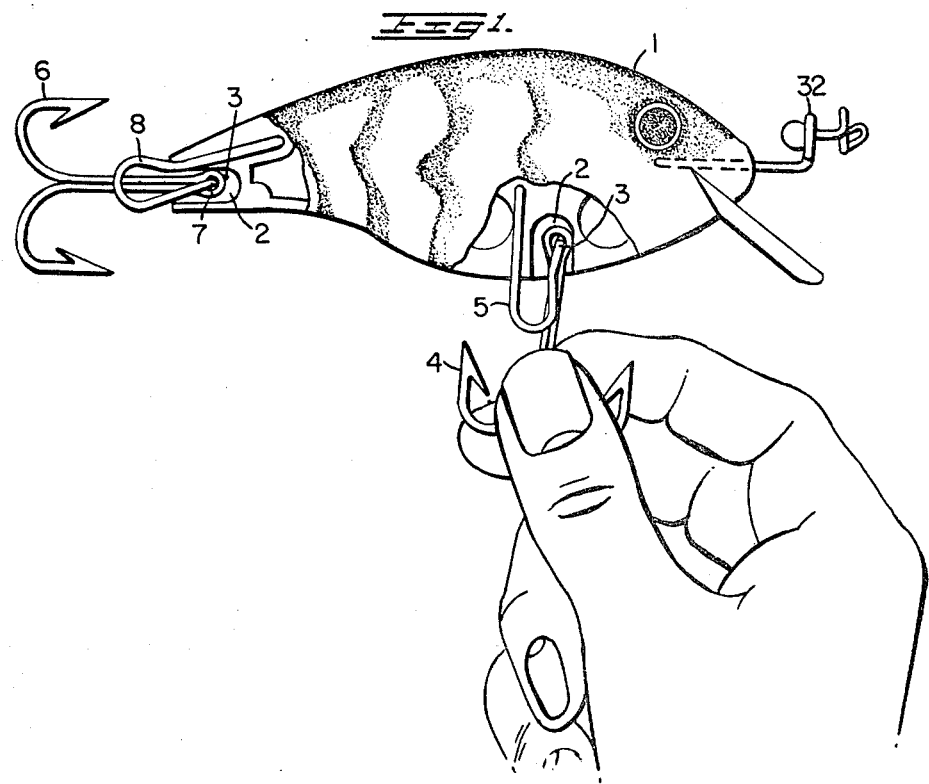
FIG. 1 is an illustration of a typical fishing lure in the process of manual assembly.

Referring to the drawings, FIG. 1 illustrates the essence of the present invention, that is, assembling the hooks to a fishing lure by simply pressing them into the lure body and removing them by pressing them into the lure body and twisting.

In FIG. 1 the tail hook 6 has been connected to the hanger 8 by pressing it into the cup so that the free end 3 of the hanger snaps into the hook eye 7. The hook has not been fully drawn onto the hanger loop in this view. Hook 4 has been pressed into the lure body 1 and is being rotated 90 degrees so that it will disengage the spring hanger 5 so that it may be withdrawn free of the lure and hanger.

FIG. 1 illustrates a manual assembly and disassembly procedure but it should be realized that these simple mechanical assembly movements can readily be accomplished by a machine.

Figure 2:
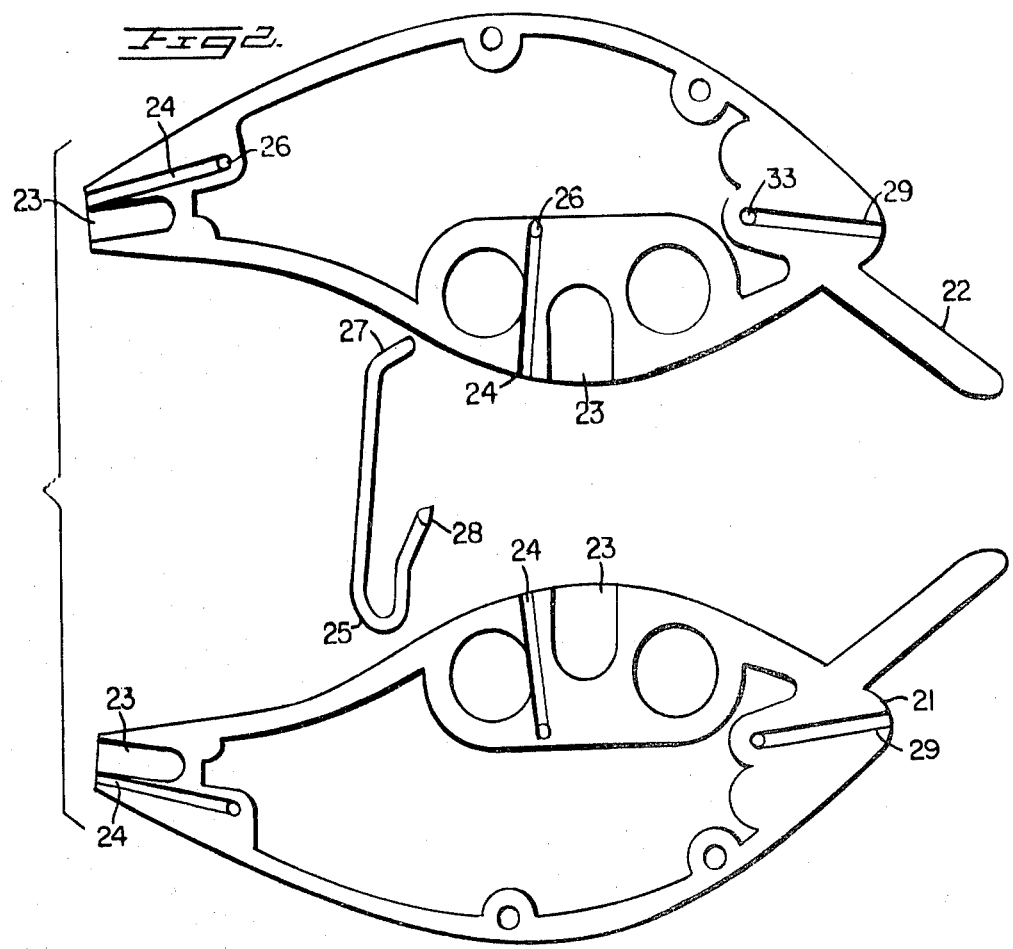
FIG. 2 illustrates the two halves of a hollow lure adapted to utilize the assembly methods contained herein.

A hollow lure may be fabricated using the techniques disclosed herein by first molding two halves of a lure body similar to those illustrated in FIG. 2. The halves 21 and 22 incorporate a plurality of one-half cup shaped recesses 23 which form the bores for the hook hangers when final assembly is accomplished. Adjacent to each bore 23 in both lure body halves 21 and 22 are channels 24 adapted to receive one leg of the spring hook hangers 25.

Lure body half 22 includes a small bore 26 at the end of channel 24 which is adapted to receive the hook portion 27 of hanger 25 so that when the lure is assembled the hangers 25 will be held securely within the lure body and their free ends 28 will be suspended within the cups formed by depressions 23.

A channel 29 is provided in the front portion of each lure half 21 and 22 and the channel in half 22 incorporates a bore 33 which is adapted to receive a connector which may be provided with a simple eyelet 31 or it may be a more secure connector 32 such as illustrated in FIG. 1 and described in U.S. Pat. No. 3,869,821 on "Connector Combined With Fishing Float, Leader, Sinker Or Lure Apparatus" issued Mar. 11, 1975 to Welbourne D. McGahee.

An alternate embodiment of the present invention may be accomplished by providing a hook hanger configuration in place of the connector 31 or 32.

When assembling the hollow lure, the hangers 25 and connector 31 or 32 are properly positioned and the two halves are sealed together. Once the halves have been sealed together, hooks may be inserted by simply pressing them into the cups formed by cup halves 23 so that the end 28 of the hangers 25 will engage the hook eye.

FIGS. 3A, B, C and D illustrate the steps of connecting a hook eye to a preferred embodiment of the invention. In FIG. 3A the bore or cup 2 has a radius formed in the bottom dimensioned so that as the free end 3 of the spring retainer is forced toward the center of the bore it will not bind on the bottom. Thus when a hook eye 7 is placed between leg 3 and the wall of the bore as illustrated in FIG. 3A and pushed down as illustrated in FIG. 3B the spring arm 3 is deflected toward the center of the bore as the hook eye 7 approaches the bottom of the bore 2. When the wire forming the hook eye passes the end of spring retainer leg 3 as in FIG. 3C, the spring retainer snaps toward the wall of bore 2 and enters the hook eye. The hook 7 may then be drawn out of the bore 2 as in FIG. 3D with the spring retainer passing through the hook eye securing it to the body 1.

Any attempt to remove the hook from the connector by pushing the hook into the bore 2 and pulling it out will fail to disconnect the hook eye from the connector 4. For instance in FIG. 3C note that when the hook is in the extreme down position the end of retainer leg 3 is still through the eye of the hook and if the hook is depressed even further it is stopped by the bottom of the bore and forced toward the center causing the retainer arm 3 to enter further into the eye.

FIGS. 4A, B, C and D illustrate the steps of removing a hook from the retainer. In FIG. 4A the hook 7 is positioned so that the eye is moved down the free leg 3 of the retainer spring until it stops at the position shown in FIG. 4B, which is the same position as when the hook is installed in FIG. 3C. The eye is pressed against the wall of bore 2 and the end of spring retainer leg 3 is in the center of the eye. The hook eye is then twisted 90 degrees as illustrated in FIG. 4C. This causes one side of the hook eye to engage spring retainer arm 3 and create a fulcrum against which the hook eye may be rotated to snap it free from the end of the spring retainer leg 3. The hook eye becomes disengaged from the retainer as illustrated in FIG. 4C because the rotating motion of the hook eye deflects the end of the spring retainer arm 3 away from the wall of the bore 2, allowing the material of the hook eye to pass therebetween. Once the hook eye is free of the retainer it is removed by pulling it straight out of the bore 2 as illustrated in FIG. 4D.

FIGS. 5A, B, C and D illustrate an embodiment where the bore or cup 2 has a flat bottom and the spring retainer is positioned so that inward deflection by the hook eye closes the gap between the bottom of the cup and the end of the retainer leg 3. A hook 7 is inserted in this embodiment by sliding it down the wall of the bore as illustrated in FIG. 5A, twisting the hook past 90 degrees as illustrated in 5B and withdrawing the hook with the spring retainer arm through the eye as illustrated in FIG. 5C. The hook is removed by reversing the installation procedure, that is sliding the hook down the shaft of spring retainer arm 3 until it is in the position illustrated in FIG. 5C and rotating the shaft greater than 90 degrees and withdrawing it along the side of the spring arm 3 as illustrated in FIG. 5A.

Solid lures are produced by using a die similar to that illustrated in FIG. 15. The die incorporates grooves 41, 42 and 52 which are adapted to receive the arcuate portions of hangers 43 and 44 and the section of connector 31 or 32 which will extend outside of the completed lure body. The embedded ends 53 of the hangers 43 and 44 and connector 31 or 32 are bent 90 degrees as illustrated in FIG. 16 so they will not pull out under stress. This bent section 53 cannot be seen in FIG. 15 due to the viewing angle.

The die halves also include channels 45 which are adapted to receive a shoulder portion of male mold inserts 46 which are placed over the free ends of the hangers to form a cup thereabout during the molding process.

The male mold sections 46 are more clearly illustrated in FIG. 16 which shows a slit 47 in the side of the male mold which will permit the mold to be drawn off of the hanger after the lure body has been molded.

In FIG. 15 two mold halves have been brought together with the hangers and male molds in place ready for injection molding.

The male molds 46 may be dispensed with in solid body molds by using a pre-assembled hanger comprised of a hollow cup 61 with a spring hanger member 62 welded to the outside as illustrated in FIG. 17. In this embodiment the hanger is completely self contained and no further manipulations are required after the mold halves are removed from the lure body and before hooks are inserted. However, the die must be dimensioned so that the channels 41 and 42 will hold the hangers 62 so that they will hold the open end of the cups 61 firmly against the inner surface of the mold cavity to prevent mold material from entering.

In the alternate embodiment illustrated in FIG. 19, the pre-assembled hanger is comprised of a preformed cup 63 which has a continuous channel 64 along one side and the bottom dimensioned to receive the section 65 of spring hanger 66 which will be immobile after final assembly. A resilient ring 67 is positioned about the preformed cup 63 and spring hanger 66 as illustrated to hold the two pieces together during the molding process. The ring 67 may be fabricated from a plastic or metallic material. In a preferred embodiment, section 65 of spring hanger 66 is bent to form an angle smaller than the angle of the channel 64 at the transition from side to bottom. This is provided so that the spring hanger 66 will urge the preformed cup 63 against the mold cavity wall to keep molding material from entering the cup.

Fishing lures may be assembled as previously described using a variety of hanger shapes similar to those illustrated in FIGS. 5 through 14.

FIG. 6 illustrates a hanger having relatively straight restraining and free legs 10. This retainer configuration, as well as the other retainer configurations illustrated and discussed herein may be incorporated with dome shaped cup or bores, or flat bottom cups or bores which are closely spaced to the retainer and/or spaced at a relatively great distance therefrom.

FIG. 7 illustrates a spring retainer having a leg 20 wherein the end portion is bent at an angle of approximately 45 degrees away from the constrained leg.

The spring retainer illustrated in FIG. 8 utilizes a leg 30 having a modified "S" form.

FIG. 9 illustrates the use of a cup 41 which has an under cut portion 42 adapted to receive the end of spring retainer leg 40. The spring retainer is shown with a hook portion formed in the free end but it is to be understood that retainers having configurations similar to 10, 20 and 30 illustrated in FIGS. 6, 7 and 8 respectively may also be used with an under cut portion.

FIG. 10 discloses a spring retainer configured so that leg 50 curves back toward the secured leg and stops essentially against the wall of the bore adjacent to the secured leg. When hooks having this configuration or the configuration illustrated in FIGS. 11 or 12, the method of inserting a hook eye 7 is to slide the eye 7 down the wall of the bore between the secured and free legs.

FIG. 11 illustrates a retainer wherein the free end 60 is bent at an angle of between 20 and 90 degrees toward the fixed leg.

FIG. 12 illustrates a retainer configuration similar to that disclosed in FIGS. 10 and 11 adapted to cooperate with an under cut portion 72. In this configuration, the bore or cup 71 is configured with an under cut portion 72 adapted to receive the end of the spring retainer 70.

The retaining rod 90 illustrated in FIG. 13 is relatively rigid and the cup 91 is provided with an under cut portion 92 and 93. One end of the rod 90 is secured in the under cut portion 92 by a hinge pin 94. The rod is dimensioned so that the other end will swing within the under cut portion 93 but will be prevented from exiting the surface of the body. A hook 7 is secured in this retainer by forcing the hook 7 into the bore so that the rigid arm swings toward the bottom of the bore. The bore must be held in a straight down position so that gravity will cause the rigid arm to drop through the hook eye 7 as one edge of the eye passes thereby. The hook is removed in this embodiment by rotating the hook eye 7 90 degrees when held in the bottom of the bore.

FIG. 14 discloses another use of a straight retainer rod 80. This rod is resilient and adapted to cross and descend the bore so that a hook eye 7 will cause the end to be deflected downward as it is pushed into the bore.

As the eye 7 passes the free end of retainer 80, retainer 80 will snap into the eye opening of eye 7.

Figure 18:
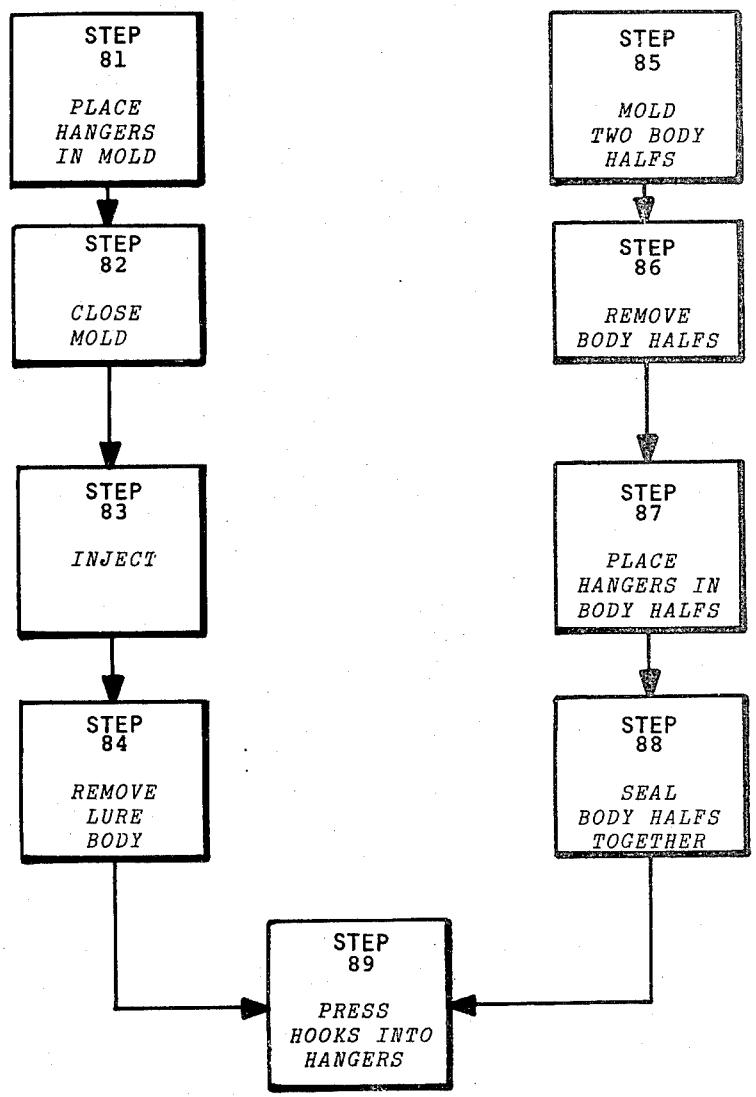
FIG. 18 is a flow diagram depicting an automated lure assembly sequence.

The sequence of the assembly method utilizing hook hangers similar to those disclosed in the co-pending patent application Ser. No. 760,920 on "Loop Retainer" filed by Welbourne D. McGahee on January 21, 1977 and the devices previously discussed herein require steps similar to the flow diagram illustrated in FIG. 18. In this flow diagram note that two different processes are used to produce solid and hollow lure bodies but both processes merge in the common step 89 of pressing hooks into hangers.

Considering each process in detail, note the first step 81 of producing a solid lure requires placing the hangers in a mold half adapted to receive them. The next step, 82 is to close the mold after which step 83 is performed wherein a suitable plastic is injected into the mold cavity. Once the injection molded lure body has been suitably cured, it is removed in step 84 from the mold halves. After removable, the lure body complete with hangers is processed in step 89 where hooks are pressed into the hangers. In some instances step 89 will be done by the fisherman when lures are shipped with the hooks off.

In fabricating a hollow lure body the first step 85 is to mold two body halves. When the body halves have cured, they are removed from the molds in step 86 and hangers are placed in the hanger reception channels in step 87. After the hangers have been placed in the molded half, the other molded half is brought into position and the two halves are sealed together in step 88. After the halves have been assembled into a hollow lure body, hooks are pressed into the hanger cups in step 89.

The preceeding steps can be accomplished manually or they may be accomplished by an automated machine utilizing well known automated assembly procedures.

Although the preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim as a new and useful contribution to the art and for which I desire letters patent is:

1. A method for fabricating a fishing lure comprising the steps of:
   producing a molded lure body incorporating hook hangers with a secured end and a free end which engages a cooperating bore; and pressing the eye portion of a hook into said bore until it engages said hook hanger by forcing said free end out of engagement with said bore wall and then permitting said free end to pass through the hook eye to reengage said bore wall.

2. A method for fabricating a fishing lure comprising the steps of:
   molding first and second mating lure body halves incorporating bore forming cavities;
   placing hook hangers in channels formed in said molded lure body halves;
   sealing said lure body halves together to form hollow fishing lures incorporating hook hangers; and pressing the eye portion of hooks into said bores until they engage said hook hangers.

3. The method for producing a fishing lure as defined in Claim 2, wherein said steps are accomplished by automation.

4. A method of assembling a fishing lure having biased hook retainers located in recessed cups, with a free end of said hook retainers engaging the side wall of said recessed cups, comprising:

pressing the eye of each hook into each of said cups until said hook retainer free end is forced away from said side wall and enters said hook eye and reengages said side wall.

* * * * *